US010523493B2

(12) United States Patent
Hill et al.

(10) Patent No.: US 10,523,493 B2
(45) Date of Patent: Dec. 31, 2019

(54) CROSS-CLOUD OPERATION MANAGEMENT

(71) Applicant: Oracle International Corporation, Redwood Shores, CA (US)

(72) Inventors: Peter John Hill, Seattle, WA (US); David Allen McArthur, Seattle, WA (US); Jorgen Lawrence Johnson, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 58 days.

(21) Appl. No.: 15/966,505

(22) Filed: Apr. 30, 2018

(65) Prior Publication Data

US 2019/0334757 A1 Oct. 31, 2019

(51) Int. Cl.
*G06F 15/16* (2006.01)
*H04L 12/24* (2006.01)
*G06F 9/54* (2006.01)
*H04L 29/08* (2006.01)
*H04L 12/911* (2013.01)

(52) U.S. Cl.
CPC ............ *H04L 41/046* (2013.01); *G06F 9/547* (2013.01); *H04L 47/70* (2013.01); *H04L 67/1097* (2013.01); *H04L 67/20* (2013.01); *H04L 67/26* (2013.01)

(58) Field of Classification Search
CPC ... H04L 41/046; H04L 47/70; H04L 67/1097; H04L 67/20; H04L 67/26; G06F 9/547
USPC ................ 709/202, 204, 205, 223, 226, 227
See application file for complete search history.

(56) References Cited

U.S. PATENT DOCUMENTS

| 2011/0265147 A1* | 10/2011 | Liu ........................ H04L 63/08 726/4 |
| 2011/0295998 A1* | 12/2011 | Ferris .................... G06F 9/5072 709/224 |
| 2011/0296000 A1* | 12/2011 | Ferris .................... G06Q 10/00 709/224 |
| 2015/0120920 A1* | 4/2015 | Ferris .................... G06F 9/5072 709/224 |
| 2018/0025403 A1* | 1/2018 | McKay ............. G06Q 30/0283 705/26.44 |
| 2018/0068125 A1* | 3/2018 | Redberg ................ G06F 21/602 |
| 2019/0238636 A1* | 8/2019 | Li .......................... H04L 67/20 |

\* cited by examiner

*Primary Examiner* — Liang Che A Wang
(74) *Attorney, Agent, or Firm* — Invoke

(57) ABSTRACT

Operations include executing operations across different third-party computing clouds provided by different vendors. A cloud discovery process allows for a virtual machine, executing on a computing cloud, to discover resources on a different computing cloud provided by a different vendor. The cloud discovery process is implemented by one or more cloud agents executing within third-party clouds. A cloud agent, corresponding to a third-party computing cloud, may use a cross-cloud repository that is maintained by a tenant to discover resources in other third-party computing clouds provided by different vendors. An Application Programming Interface (API) for accessing a particular third-party computing cloud may be exposed to a cloud agent of another third-party computing cloud provided by a different vendor. The cloud agent may trigger operations on the particular third-party computing cloud based on events detected by the cloud agent in the third-party computing cloud corresponding to the cloud agent.

20 Claims, 5 Drawing Sheets

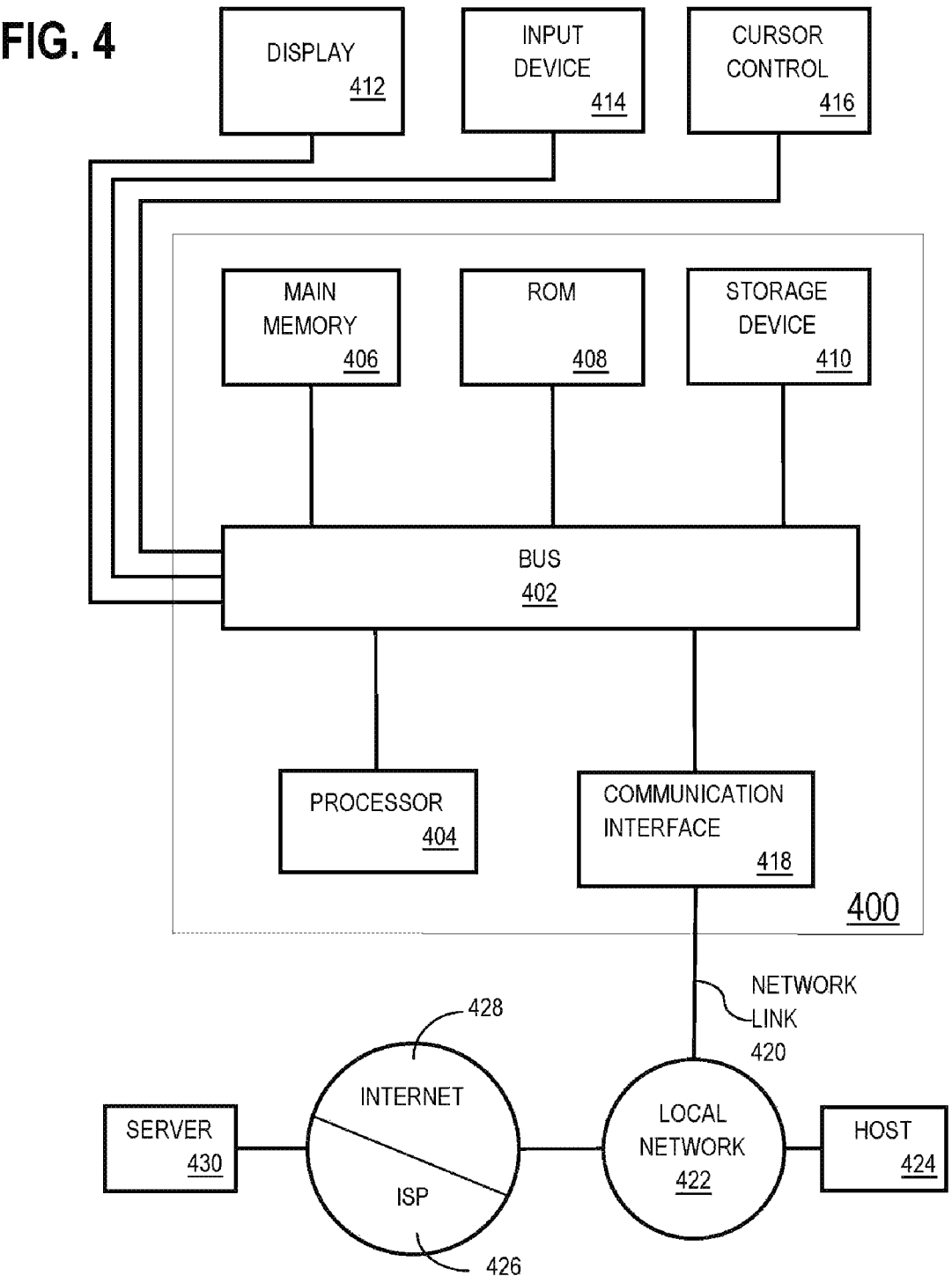

CROSS-CLOUD OPERATION MANAGEMENT

TECHNICAL FIELD

The present disclosure relates to cloud computing. In particular, the present disclosure relates to managing the execution of operations across multiple cloud providers.

BACKGROUND

Cloud computing involves the use of hardware and software resources to provide services over a network. In many cloud computing models, the responsibility of providing and maintaining the hardware and software infrastructure falls on the cloud service provider. By shifting these responsibilities to the cloud service provider, organizations or individuals may quickly access complex systems and applications without incurring the upfront costs of acquiring the supporting infrastructure. Another benefit of cloud computing is that resources may be shared by multiple tenants, which improves scalability and reduces the costs of the underlying infrastructure.

Multiple cloud service providers offer services to tenants. A cloud service provider may provide cloud storage services for storing data. A cloud service provider may provide processing resources for processing data. A particular tenant may use resources across multiple cloud providers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates a block diagram of a system in accordance with one or more embodiments.

DETAILED DESCRIPTION

Figure 1A:
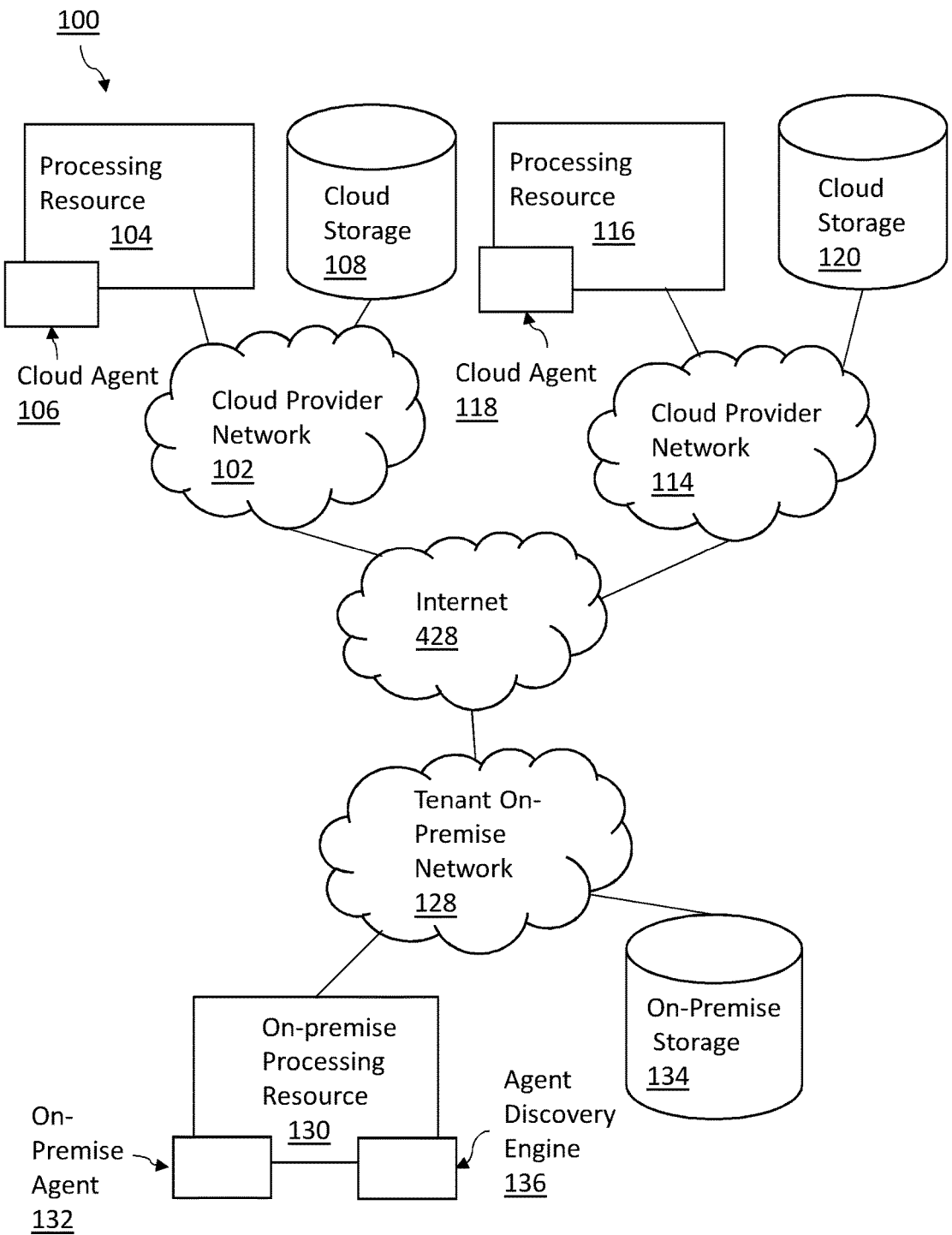
FIGS. 1A-1B illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. CROSS-CLOUD RESOURCE DISCOVERY
4. EXECUTING CROSS-CLOUD OPERATIONS
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

A computing cloud or "cloud" includes a set of configurable system resources (also referred to herein as "cloud resources"). A cloud resource may include a storage resource such as memory. A cloud resource may include a processing resource such as a virtual machine. A private computing cloud is a computing cloud that is maintained privately by an entity, and accessible to devices within a private network associated with the entity. A public computing cloud is a third-party computing cloud that is provided as a service by a vendor, generally over the Internet, to one or more tenants. A vendor, providing a third-party computing cloud, may also be referred to herein as a "cloud provider".

One or more embodiments execute operations across different third-party computing clouds provided by different vendors. Different vendors may provide respective computing clouds to a same tenant. Operations across different third-party computing clouds may be necessary, for example, to synchronize tenant data across different third-party computing clouds provided by different vendors. An event executed in or associated with a third-party computing cloud provided by a particular vendor may trigger an operation in another third-party computing cloud provided by another vendor.

One or more embodiments include a cloud discovery process. A cloud discovery process allows for a virtual machine, executing on a computing cloud provided by a vendor to a tenant, to discover resources on a different computing cloud provided by a different vendor. The cloud discovery process is implemented by one or more cloud agents executing within third-party clouds. Such cloud agents are processes that may communicate across third-party clouds, and private networks maintained by a tenant. A cloud agent, corresponding to a third-party computing cloud, may use a cross-cloud repository that is maintained by a tenant to discover resources in other third-party computing clouds provided by different vendors.

One or more embodiments communicate across different third-party computing clouds provided by different vendors. An Application Programming Interface (API) for accessing a particular third-party computing cloud may be exposed to a cloud agent of another third-party computing cloud provided by a different vendor. The cloud agent may trigger operations on the particular third-party computing cloud based on events detected by the cloud agent in the third-party computing cloud corresponding to the cloud agent.

One or more embodiments described in this Specification and/or recited in the claims may not be included in this General Overview section.

2. Architectural Overview

FIG. 1A illustrates an example of a system 100 in accordance with one or more embodiments. As illustrated in FIG. 1A, system 100 includes a tenant on-premise network 128, cloud provider network 102, and cloud provider network 114. In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In an embodiment, cloud provider network 102 provides connectivity between a set of cloud resources. The cloud resources may include, but are not limited to, a set of deployed hardware and/or software resources used to provide a software-as-a-service (SaaS), a database-as-a-service (DBaaS), a platform-as-a-service (PaaS), an infrastructure as a service (IaaS), or any other cloud computing service for one or more tenants. As detailed in Section 6, cloud provider network 102 may facilitate communication between the resources via elements such as physical links, virtual links, and/or an overlay network. The network elements and resources are collectively referred to herein as the cloud provider network 102, or "cloud." Each cloud is provided as a service by a vendor, generally over the Internet, to one or more tenants. A vendor, providing cloud services, may also be referred to herein as a "cloud provider" or "cloud vendor."

System 100 includes two cloud provider networks 102, 114. Cloud provider network 102 corresponds to a first cloud provider, cloud provider A. Cloud provider network 114 corresponds to a second cloud provider, cloud provider B. Two cloud provider networks are pictured for simplicity, although the system 100 may include additional cloud provider networks corresponding to additional cloud providers.

Cloud provider network 102 includes a plurality of cloud resources. The cloud resources represent cloud computing infrastructure that may be provisioned to provide a cloud service (e.g., a PaaS, SaaS, etc.) to one or more tenants. Cloud resources may include hardware, software, and/or other cloud services. Examples of cloud resources include a processor, a data storage, a virtual machine, a container, and/or a software application. As detailed in Section 6, cloud resources may be shared between multiple tenants and dynamically assigned on an on-demand basis.

In an embodiment, the cloud provider network 102 includes a plurality of data centers comprising the resources. The data centers may be distributed across different physical regions. As an example, cloud provider A may maintain data centers in physical regions such as United States (U.S.) West I and U.S. East II. A cloud provider may replicate data across multiple data centers within a particular region.

In an embodiment, a resource may include an interface through which a tenant may access the resource. As an example, an interface may allow a software agent to initiate the storage of data in a particular region. An interface may include, but is not limited to, an application programming interface (API), a web service portal, and/or a graphical user interface (GUI). As an example, an interface may establish an API endpoint for accessing a cloud service. Via the API, other resources, internal or external to the cloud provider network 102, can initiate operations in a resource of cloud provider network 102. An API endpoint may comprise one or more uniform resource locators (URLs) and/or one or more hypertext transfer protocol (HTTP) commands for communicating with a service. As an example, an API endpoint may include a URL and a set of HTTP messages for interacting with a DBaaS instance. The HTTP messages may include embedded database commands for storing, retrieving, and modifying data in the DBaaS instance. The API endpoints, URLs, and HTTP commands may vary from one service to another.

In an embodiment, cloud storage 108 is a type of cloud resource, as described above. Cloud storage 108 may be any type of storage unit and/or device (e.g., a file system, collection of tables, or any other storage mechanism). Further, cloud storage 108 may include multiple different storage units and/or devices. The multiple different storage units and/or devices may or may not be of the same type or located at the same physical site. Further, cloud storage 108 may be implemented or may execute on the same computing system as processing resource 104. Alternatively, or additionally, the cloud storage 108 may be implemented or executed on a computing system separate from processing resource 104.

In an embodiment, processing resource 104 is a type of cloud resource, as described above. Processing resource 104 is configured to execute processing tasks. As examples, processing resource 104 may be a virtual machine or processor.

In an embodiment, cloud agent 106 is a software agent for managing cross-cloud operations. Cloud agent 106 includes functionality to detect events executed by or associated with the processing resource 104. An event executed by or associated with the processing resource 104 may include processing of a data set by the processing resource 104. An event executed by or associated with the processing resource 104 may include initiating storage of data. As an example, processing resource 104 may transmit a value to cloud storage 108 for storage. Cloud agent 106 may manage one or more directories for the storage of files. Cloud agent 106 may continuously monitor the directories, to detect any changes to files in the directories. Cloud agent 106 may be executed on processing resource 104. Cloud agent 106 may be executed on behalf of a particular tenant.

In an embodiment, the cloud agent 106 manages data policies. A data policy may specify actions associated with data storage and data processing. A data policy may specify resources for data storage. As an example, a data policy may specify a storage resource on a third-party cloud to which an agent should transmit new data for storage. As another example, a data policy may specify a directory on a third-party cloud from which a resource should pull modified data for back-up storage. A data policy may specify resources for data processing. As an example, a data policy may specify a processing resource on a third-party cloud for processing data. Each data policy may map to a corresponding event. As an example, an event, storing data to Directory X in cloud provider network 102, maps to a corresponding data policy, back up the data to Directory Y in cloud provider network 114. As another example, an event, receive data for long-term processing in cloud provider network 102, maps to a data policy, push the data to cloud provider network 114 for long-term processing.

In an embodiment, data policies may be determined as a function of resource characteristics. A data policy may be based on resource latency (e.g., high or low latency). As an example, a data policy specifies that a first type of data, requiring low-latency processing, should be processed using a first cloud provider's short-term data processing resource. A second type of data, not requiring low-latency processing, should be processed using a second cloud provider's long-term data processing resource. Alternatively, or additionally, a data policy may specify a physical region for storing a particular type of data. As an example, a data policy may specify that data should be replicated to Cloud X in the region which is physically nearest to the client on-premise network.

In an embodiment, cloud agent 106 includes one or more configuration files. A configuration file refers to a data object storing instructions for managing cloud resources. A configuration file may include a list of instructions for creating new resource configurations, reading current configurations, updating resource configurations, and/or deleting resource configurations. A configuration file may include a list of directories and data policies corresponding to the respective directories. Alternatively, or additionally, a configuration file may include an URL to which cloud agent 106 should transmit a notification upon detecting an event. A configuration file may indicate another cloud agent to which cloud agent 106 should transmit a notification upon detecting an event.

In an embodiment, cloud agent 106 includes functionality to identify a policy corresponding to an event. Cloud agent 106 may identify a policy that maps to a particular event or event type. As an example, the cloud agent may identify a policy that maps to changes in a file in Directory X in cloud storage 108. As another example, cloud agent 106 may identify a policy corresponding to the creation of a new variable in association with processing resource 104. The cloud agent may retrieve policy locally, e.g., from the cloud agent's configuration file. Alternatively, or additionally, the cloud agent may retrieve policy from the cross-cloud repository, directly or indirectly. As described below with respect to FIG. 1B, the cross-cloud repository may be used to centrally manage agents and policies.

In an embodiment, cloud agent 106 includes functionality to initiate operations in another cloud provider network (e.g., cloud provider network 114). The cloud agent 106 may initiate an operation using an interface of a resource in cloud provider network 114. The operation may include data synchronization to third-party cloud storage (e.g. cloud storage 120). The operation may include computations via a third-party processing resource (e.g. processing resource 116). The cloud agent 106 may be assigned access credentials, corresponding to one or more resources in other cloud networks (e.g., cloud provider network 114). The access credentials may correspond to user names, passwords, digital certificates, authentication tokens, and/or authentication protocols, such as Open Authorization (OAuth) for accessing other cloud services. Using the credentials, the cloud agent 106 may access an interface (e.g., an API) of a resource in cloud provider network 114.

Alternatively, cloud agent 106 may transmit a notification to a second, policy-handling cloud agent executing on a second processing resource in cloud provider network 102 (not pictured). Cloud agent 106 may transmit the notification to the policy-handling cloud agent upon detecting an event executed in or associated with cloud provider network 102. The policy-handling cloud agent may be implemented as a service layer for managing data policies. The policy-handling cloud agent may identify a policy corresponding to an event. The policy-handling cloud agent may further initiate operations in other clouds, based on the identified policy. Access to the policy-handling cloud agent may be granted on a restricted basis, as compared to access to the cloud agent 106. Accordingly, the policy-handling cloud agent may be implemented as a layer to harden the system.

In an embodiment, cloud provider network 114 is substantially similar to cloud provider network 102, described above. Cloud provider network 114 is associated with cloud provider B. The resources in cloud provider network 114 are substantially similar to the corresponding resources in cloud provider network 102, described above. Cloud storage 120 is substantially similar to cloud storage 108. Processing resource 116 is substantially similar to processing resource 104. Cloud agent 118 is substantially similar to cloud agent 106.

In an embodiment, on-premise processing resource 130 is any device that includes at least one hardware processor and functionality to execute operations using the hardware processor. The on-premise processing resource 130 is maintained by, and local to, the tenant associated with cloud agent 106 and cloud agent 118. The on-premise processing resource 130 is configured to process data.

In an embodiment, on-premise agent 132 is a software agent for managing cross-cloud operations. On-premise agent 132 may be substantially similar to cloud agent 106, described above.

In an embodiment, on-premise storage 134 is any type of storage unit and/or device (e.g., a file system, collection of tables, or any other storage mechanism). Further, on-premise storage 134 may include multiple different storage units and/or devices. The multiple different storage units and/or devices may or may not be of the same type or located at the same physical site. Further, on-premise storage 134 may be implemented or may execute on the same computing system as on-premise processing resource 130. Alternatively, or additionally, the on-premise storage 134 may be implemented or executed on a computing system separate from on-premise processing resource 130. The on-premise storage 134 may be communicatively coupled to the on-premise processing resource 130 via a direct connection or via tenant on-premise network 128.

In an embodiment, tenant on-premise network 128 facilitates communication between on-premise processing resource 130, on-premise storage 134, and other tenant on-premise devices. The tenant on-premise network 128 may, for example, be a Local Area Network (LAN) maintained by a tenant. As examples, the tenant on-premise network 128 may be a large-scale network maintained by a company, or a home computing system maintained by an individual.

Figure 1B:
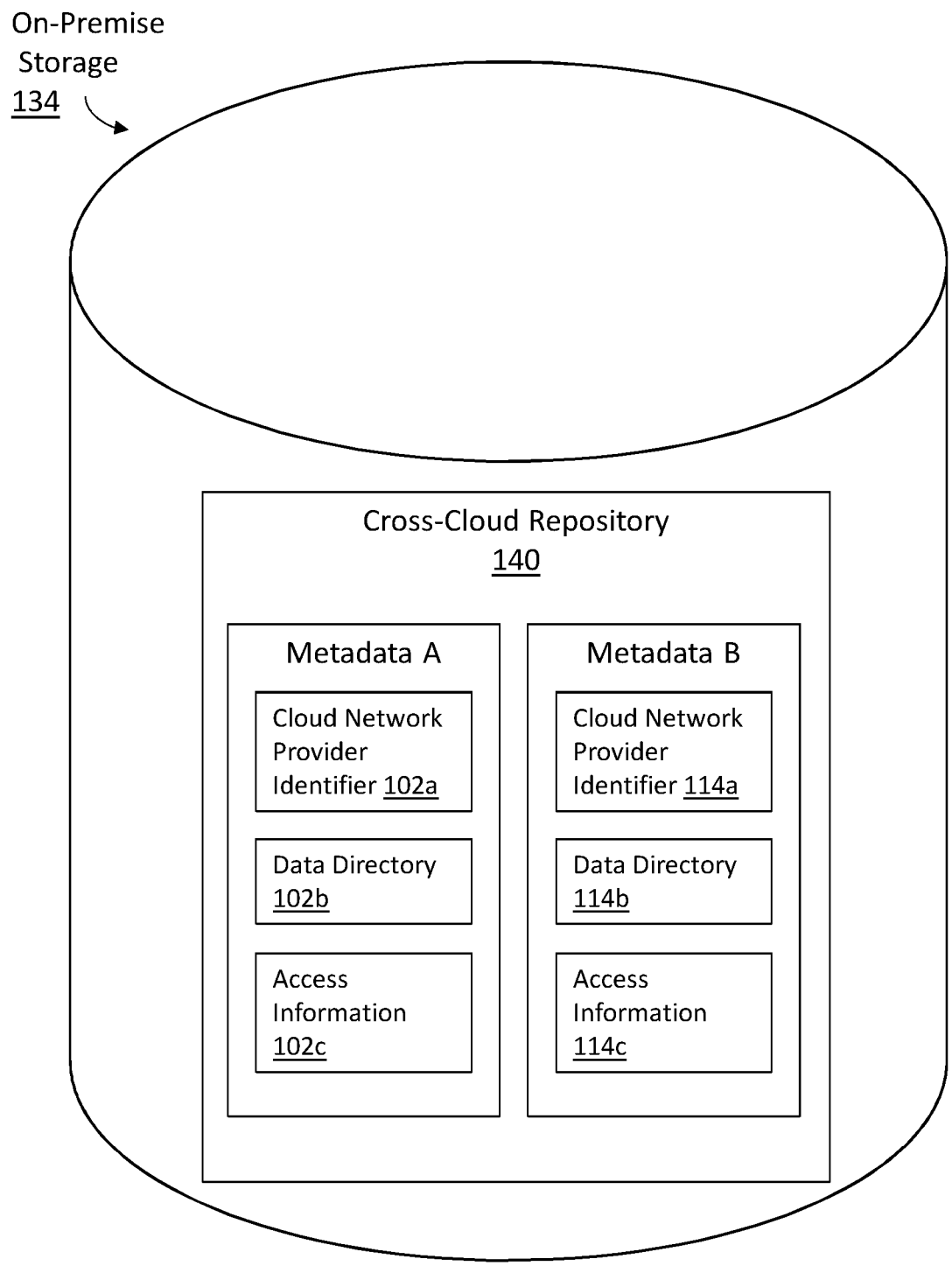

Referring to FIG. 1B, on-premise storage 134 includes a cross-cloud repository 140. The cross-cloud repository 140 comprises information about a plurality of clouds maintained by a plurality of respective cloud vendors. The cross-cloud repository 140 may include information characterizing resources and services managed by a cloud provider.

Although the cross-cloud repository is illustrated in association with the on-premise storage 134, the cross-cloud repository may itself be implemented on a device in a particular cloud provider network. Access information for the cross-cloud repository may be distributed to cloud agents in other cloud provider networks.

In an embodiment, Metadata A describes data associated with cloud provider A. Metadata A may describe resources available in a cloud provider network, such as processing resources and storage resources. Metadata A includes cloud network provider identifier 102a, data directory 102b, and access information 102c.

In an embodiment, cloud network provider identifier 102a is unique sequence of characters used to identify cloud provider A. As examples, cloud network provider identifier 102a may be a sequence of numbers, a sequence of alphanumeric characters and symbols, or simply "Cloud_A".

In an embodiment, data directory 102b comprises information about data stored to or associated with cloud provider network 102. Data directory 102b may correspond to storage locations within cloud storage 108. Data directory 102b may organize data using formats such as a list, table, or index. Data directory 102b may include subdirectories, data names, and data attributes. Data directory 102b may specify a data location. As examples, data directory 102b may specify a particular data center, region, or device.

In an embodiment, data directory 102b includes data policies. As described above with respect to cloud agent 106, data policies relate to data storage and/or processing in a particular resource, which may be external to the cloud provider network 102. The data policies map to corresponding events in cloud provider network 102. As an example, an event, storing data to a particular subdirectory in data directory 102b, maps to a data policy, replicate the data to cloud storage in cloud provider network 114.

In an embodiment, access information 102c relates to access to a particular resource. The access information 102c may include, without limitation, API framework provider information, configuration definitions, and cloud resource interface definitions. For example, access information 102c may capture details to establish an endpoint with a resource. The details may include a URL, a username, and a password to access the resource. A particular agent may access the resource using the URL, username, and password. Additionally, or alternatively, access information may include fields defining encryption, API, and/or messaging protocols. The access information 102c may specify agent access to corresponding resources. For example, cloud agent 106 in cloud provider network 102 is authorized to read, but not write, to cloud storage 120 in cloud provider network 114.

In an embodiment, metadata B describes data stored in association with cloud provider B. Metadata B includes cloud network provider identifier 114a, data directory 114b, and access information 114c. Cloud network provider identifier 114a is substantially similar to cloud network provider identifier 102a, described above. Data directory 114b is substantially similar to data directory 102b, described above. Access information 114c is substantially similar to access information 102c, described above. However, rather than describing data stored in association with cloud provider network 102 corresponding to cloud provider A, cloud network provider identifier 114a, data directory 114b, and access information 114c describe data stored in association with cloud provider network 114 corresponding to cloud provider B.

Returning to FIG. 1A, agent discovery engine 136 is hardware and/or software configured to manage cross-cloud communications between agents (such as cloud agent 106, cloud agent 118, and on-premise agent 132). The agent discovery engine 136 maintains the cross-cloud repository 140 by updating information such as data directories (including data e 111 policies) and access information. The agent discovery engine 136 may periodically receive updates from the agents. Alternatively, or additionally, the agent discovery engine 136 may periodically poll the agents to obtain updated information.

In an embodiment, the agent discovery engine 136 transmits information from the cross-cloud repository to an agent. As an example, the agent discovery engine 136 identifies a data policy indicating that cloud agent 106 in cloud provider network 102 should back up data managed by cloud agent 118 in cloud provider network 114. Agent discovery engine 136 transmits information about cloud agent 118 to cloud agent 106. As another example, the agent discovery engine 136 may transmit information about resources in one cloud to an agent in another cloud. As examples, the agent discovery engine may transmit information specifying access information, storage availability, and processing capacity of a resource in a first cloud to an agent in a second cloud.

In an embodiment, resources in the tenant on-premise network 128, cloud provider network 102, and cloud provider network 114 are communicatively coupled via the Internet 428 (described in Section 8).

3. Cross-Cloud Resource Discovery

Figure 2:
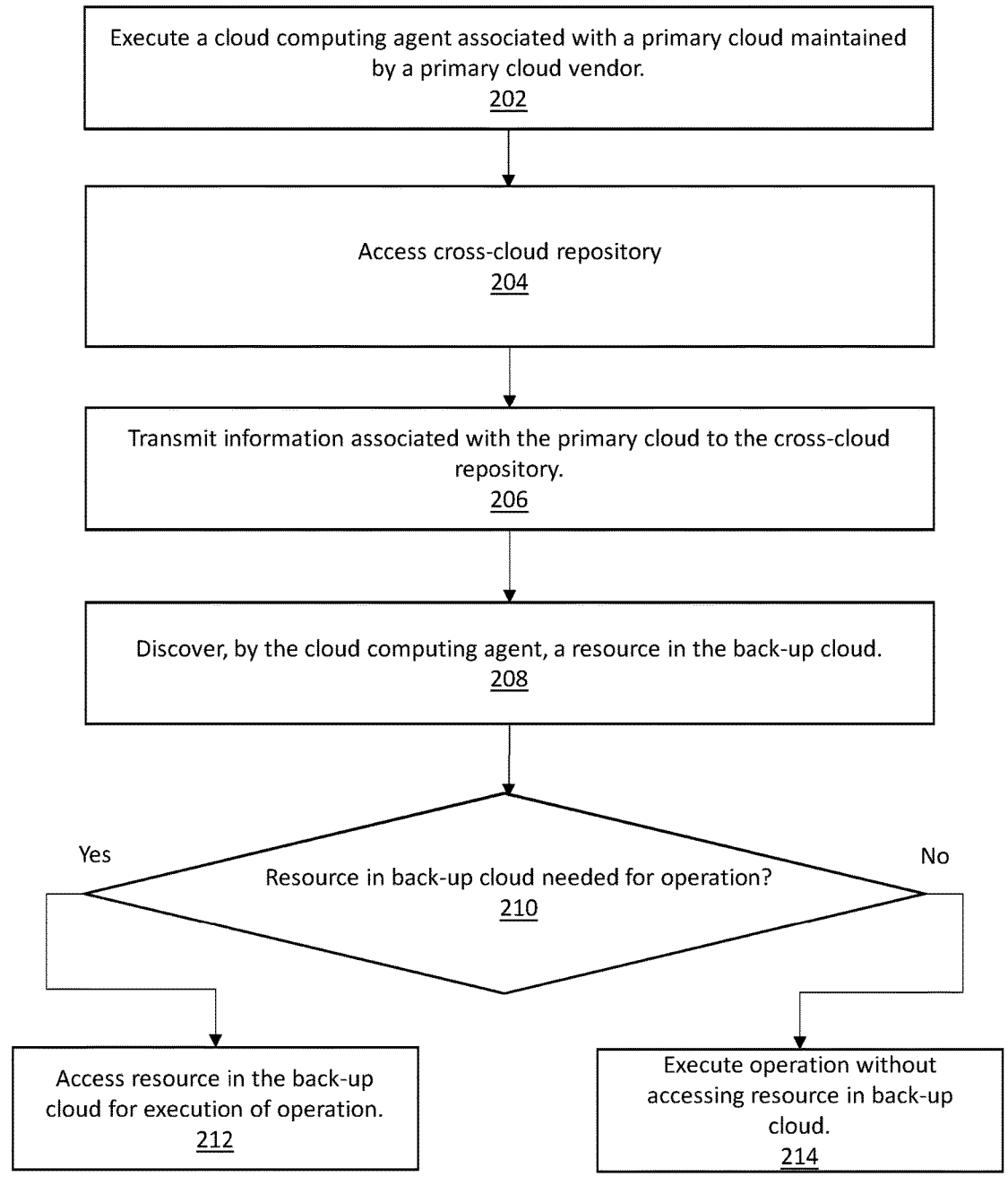
FIG. 2 illustrates cross-cloud resource discovery operations in accordance with one or more embodiments.

FIG. 2 illustrates an example set of operations for cross-cloud resource discovery in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

Some embodiments include executing a cloud computing agent (Operation 202). The cloud computing agent is associated with a primary cloud maintained by a primary cloud vendor. The system executes a cloud computing agent on behalf of a particular tenant on a processing device in the primary cloud. Multiple cloud computing agents may be executed on the primary cloud. As an example, the system may concurrently execute a first cloud agent and a second, policy-handling cloud agent. The cloud computing agent may monitor for events in the primary cloud. As an example, the cloud computing agent may manage a data directory and monitor for changes to files in the data directory. Alternatively, or additionally, a cloud computing agent (e.g., a policy-handling cloud computing agent) may remain in a passive state until receiving notification of an event.

In an embodiment, the cloud computing agent accesses a cross-cloud repository (Operation 204). The cloud computing agent may access the cross-cloud repository using a locator corresponding to the cross-cloud repository. As an example, the cloud computing agent may identify a URL, corresponding to the cross-cloud repository, in the cloud computing agent's configuration file. Alternatively, or additionally, the cloud computing agent may access the cross-cloud repository indirectly via communication with the agent discovery engine.

In an embodiment, the cloud computing agent transmits information associated with the primary cloud to the cross-cloud repository (Operation 206). The information may relate to resources, data directories, and/or data policies in the primary cloud. The cloud computing agent may periodically push the information to the cross-cloud repository. As an example, the cloud computing agent may push the information to the cross-cloud repository as the information is updated. As another example, the cloud computing agent may push information to the cross-cloud repository on an hourly or daily basis. The cloud computing agent may transmit the information to the agent discovery engine. The agent discovery engine may, in turn, transmit the information to the cross-cloud repository. Alternatively, the cloud computing agent may transmit the information directly to the cross-cloud repository.

In an embodiment, the cloud computing agent discovers a resource in the back-up cloud (Operation 208). The cloud computing agent may discover the resource in the back-up cloud via the agent discovery engine. The agent discovery engine may transmit resource information, retrieved from the cross-cloud repository, to the agent. As an example, the agent discovery engine may identify, via the cross-cloud repository, a processing resource in the back-up cloud allocated to the same tenant that manages the cloud computing agent. The agent discovery engine may then transmit an identifier and/or access mechanisms, corresponding to the processing resource, to the cloud computing agent. Alternatively, or additionally, the cloud computing agent may discover the resource in the back-up cloud by directly querying the cross-cloud repository for resource information.

In an embodiment, the cloud computing agent determines whether the resource in the back-up cloud is needed for an operation (Operation 210). The cloud computing agent may determine that additional resources are needed for the operation. As an example, the cloud computing agent determines that cloud storage allocated to the tenant in the primary cloud is full. As another example, the cloud computing agent determines that low-latency processing is available in the back-up cloud but not in the primary cloud. Alternatively, or additionally, the cloud computing agent may determine that an operation, using the resource in the back-up cloud, has been triggered by a particular event. Event-triggered operations are described in detail below in Section 4.

In an embodiment, the cloud computing agent accesses the resource in the back-up cloud for execution of the operation (Operation 212). The agent may access the resource in the back-up cloud using an API or other interface exposed by the resource. The agent may access the resource interface based on metadata stored to the cross-cloud repository. As an example, the cloud computing agent may identify, in the cross-cloud repository, a URL corresponding to the resource in back-up cloud. Using the URL, the cloud computing agent accesses the resource. The cloud computing agent may be associated with credentials for accessing the interface. As an example, the agent may use a service account for a resource in the back-up cloud to access the resource.

In an embodiment, the cloud computing agent executes the operation without accessing the resource in the back-up cloud (Operation 214). The agent may execute the operation without accessing the resource in the back-up cloud upon determining that the resource in the back-up cloud is not needed for the operation. The agent may execute the operation using a resource in the primary cloud. Alternatively, or additionally, the agent may execute the operation using a tenant on-premise resource.

4. Executing Cross-Cloud Operations

Figure 3:
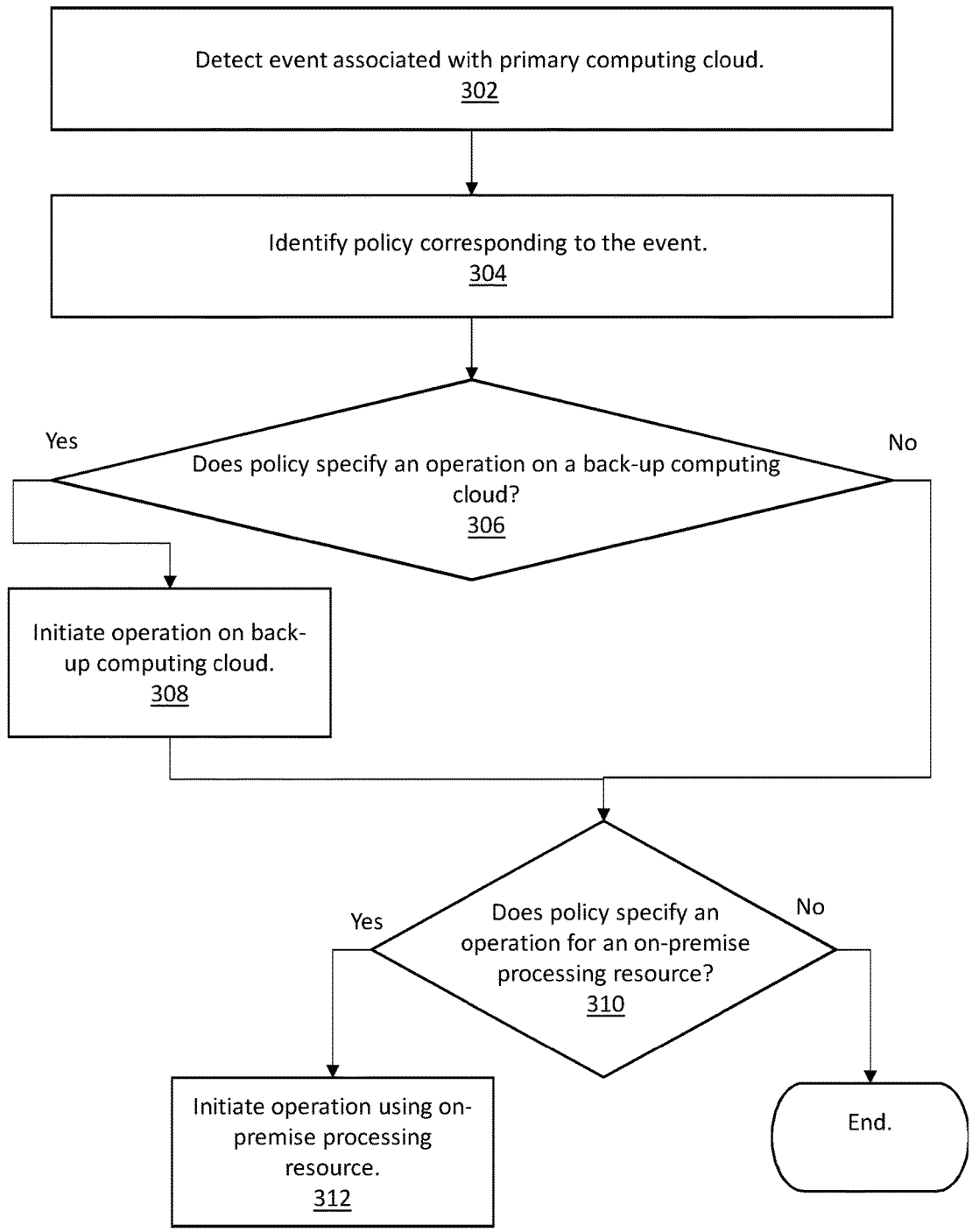
FIG. 3 illustrates cross-cloud operations in accordance with one or more embodiments.

FIG. 3 illustrates an example set of operations for executing cross-cloud operations. in accordance with one or more embodiments. One or more operations illustrated in FIG. 3 may be modified, rearranged, or omitted altogether. Accordingly, the particular sequence of operations illustrated in FIG. 3 should not be construed as limiting the scope of one or more embodiments.

In an embodiment, a cloud computing agent detects an event associated with a primary computing cloud (Operation 302). The cloud computing agent may continuously monitor cloud storage in the primary cloud for modifications. Alternatively, or additionally, the cloud computing agent may monitor a processing resource in the primary cloud for the execution of operations. The cloud computing agent may directly or indirectly detect the event. As an example of the latter, a policy-handling cloud computing agent may detect an event based on a notification received from another cloud computing agent.

Alternatively, or additionally, the cloud computing agent may detect an event associated with a back-up cloud. The cloud computing agent may receive a notification that an event has been detected in the back-up cloud. The cloud computing agent may receive the notification from a back-up cloud computing agent and/or the agent discovery engine. As an example of the former, the cloud computing agent subscribes to an event publisher executing via an agent in the back-up cloud. Via the event publisher, the cloud computing agent receives a notification of an event executed in or associated with the back-up cloud. Alternatively, or additionally, the cloud computing agent in the primary cloud may establish a secure communication channel with the back-up cloud computing agent, for receiving event notifications.

In an embodiment, the cloud computing agent identifies a policy corresponding to the event (Operation 304). The cloud computing agent may identify a locally stored data policy. As an example, the cloud computing agent may retrieve a data policy which maps to the event from the cloud computing agent's configuration file.

Alternatively, or additionally, the cloud computing agent may identify the policy corresponding to the event via the cross-cloud repository, either directly or via the agent discovery engine. The cloud computing agent may transmit information about the event to the agent discovery engine. The agent discovery engine may identify the data policy that maps to the event by querying the cross-cloud repository. The agent discovery engine may transmit the data policy to the cloud computing agent. As an example, the event is the storage of new data to a particular subdirectory in the primary cloud. The agent discovery engine queries the cross-cloud repository for a data policy mapping to the event. The agent discovery engine identifies a data policy, of an agent in the back-up cloud, corresponding to the event. The agent discovery engine transmits the policy to the cloud computing agent in the primary cloud. Alternatively, or additionally, the cloud computing agent may directly query the cross-cloud repository to identify a data policy which maps to the event.

In an embodiment, the cloud computing agent determines whether the policy specifies an operation on a back-up computing cloud (Operation 306). As an example, the policy requires replicating data corresponding to the event to a resource in a back-up computing cloud. Based on the policy, the cloud computing agent determines that the policy specifies an operation on a back-up computing cloud.

In an embodiment, the cloud computing agent initiates the operation on the back-up computing cloud (Operation 308). The cloud computing agent may initiate the operation on the back-up computing cloud via an API or other interface of the back-up computing cloud. The cloud computing agent may use credentials to access the interface. The cloud computing agent may transmit data and/or specify operations to execute on a resource of the back-up computing cloud. As an example, the cloud computing agent transmits a POST request to an API exposed by a resource in a back-up cloud, specifying a variable to store to the back-up cloud.

In an embodiment, the cloud computing agent determines whether the policy specifies an operation for an on-premise processing resource (Operation 310). The policy may specify operations to be executed via the tenant's on-premise processing resource. Alternatively, or additionally, the policy may specify data to be replicated to the tenant's on-premise storage.

In an embodiment, the cloud computing agent initiates the operation using the on-premise processing resource (Operation 312). The cloud computing agent may transmit data and/or instructions to the on-premise processing resource to initiate the operation. As an example, the cloud computing engine may initiate an operation on the on-premise processing resource via Secure Shell (SSH).

In an embodiment, the cloud computing agent may lock data. The cloud computing agent may lock data to prevent the data from being read and/or written to by another cloud computing agent. For example, the cloud computing agent may lock data while the data is being modified by the cloud computing agent. When the cloud computing agent is no longer using the data, the cloud computing agent may unlock the data. The cloud computing agent may transmit a notification, to other cloud computing agents, when the data is made available for reading and/or writing. The cloud computing agent may lock data at the file, directory, or bucket level.

In an embodiment, the cloud computing agent may initiate an operation in a particular physical region, based on an identified policy. The cloud computing agent may, for example, determine that a particular type of data is to be stored to the back-up cloud in a particular physical region. Alternatively, or additionally, the cloud computing agent may determine that a particular type of data is to be processed in the back-up cloud in the physical region which is closest to the processing resource associated with the cloud agent. Alternatively, or additionally, the cloud computing agent may determine that a particular type of data is to be stored to the back-up cloud in the physical region which is closest to the tenant-on premise processing resource. Based on the determined policy, the cloud computing agent may initiate operations in association with the prescribed physical region.

In an embodiment, cross-cloud operations may be executed responsive to the detection of an event executed by or associated with the tenant's on-premise processing resource. As an example, the cloud computing agent, executing in the primary cloud, subscribes to an event publisher executing on the tenant's on-premise processing resource. When a new variable is generated in the on premise-processing resource, the cloud computing agent receives a notification. Upon receiving the notification, the cloud computing agent initiates the storage of the variable in the back-up cloud and/or primary cloud, as described above with respect to Operations 304-312.

5. Example Embodiment

The following detailed example illustrates operations in accordance with one or more embodiments. The following detailed example should not be construed as limiting the scope of any of the claims.

A tenant, Jones Corporation, uses services in two cloud networks, ABC Cloud and XYZ Cloud. Jones Corp. primarily processes data on computing resources of ABC Cloud. Jones Corp. primarily stores data on cloud storage provided by ABC Cloud. Jones Corp. uses XYZ cloud storage for long-term data storage. Jones Corp. also executes operations and stores data on an on-premise system. The on-premise system is mostly used for operations and data storage requiring heightened security.

A cloud computing agent executes on a processing resource in ABC cloud. The cloud computing agent transmits the cloud computing agent's data policies and other metadata to the agent discovery engine by uploading a configuration file. The configuration file specifies several data policies. The first data policy is to transfer data on ABC cloud that has not been accessed within a year to long-term storage on XYZ cloud in the closest available region. The second data policy is that, when data in XYZ cloud long-term storage is accessed, the data should be replicated to ABC cloud. The third data policy is that, when an operation is needed which would result in manipulation of a secure database on Jones Corp.'s on-premise system, the operation should be executed on a processing resource on Jones Corp.'s on-premise system. The agent discovery engine initiates storage of the policies on the cross-cloud repository.

The agent transmits a cloud network provider identifier characterizing XYZ cloud to the agent discovery engine. Using the identifier, the agent discovery engine identifies storage and resources in XYZ cloud which are accessible by Jones Corp. The agent discovery engine further identifies cloud agents, associated with the resources in XYZ cloud. The agent discovery engine transmits the information to the cloud computing agent in ABC cloud.

A cloud agent in ABC cloud monitors the last time each unit of data was accessed in ABC cloud storage. The ABC cloud agent identifies an event, upon determining that a particular unit of data was not accessed in 1 year. The ABC cloud agent identifies a policy, corresponding to the event, by identifying a policy that maps to the event. The ABC cloud agent retrieves the policy from the ABC cloud agent's configuration file. The policy is to store the data to XYZ cloud's long-term storage, in the closest available region, and delete the data from ABC cloud storage.

Based on the policy, the cloud agent in ABC Cloud initiates an operation in XYZ cloud. The cloud agent accesses an API exposed by XYZ Cloud's long-term storage service. The ABC cloud agent uses a service account to gain access to the API. Via the API, the ABC cloud agent transmits the data to XYZ cloud long-term storage. The ABC cloud agent specifies that the data is to be stored to the closest physical region to the ABC cloud data center storing the data. Additionally, the ABC cloud agent initiates deleting the data from ABC cloud storage.

A second event is detected in XYZ cloud. A file in XYZ cloud long-term storage is accessed. The event is detected by a cloud agent in XYZ Cloud. The XYZ cloud agent queries the agent discovery engine to identify any external agents with policies corresponding to the event. The agent discovery engine identifies the corresponding policy in the cross-cloud repository: when data in selected directories in XYZ cloud long-term storage is accessed, the data should be replicated to ABC cloud. The agent discovery engine transmits the policy to the XYZ cloud agent.

Based on the policy, the XYZ cloud agent accesses an API of ABC cloud storage. The XYZ cloud agent transmits the data to ABC cloud storage using the API. The XYZ cloud agent uses a service account to gain access to the API.

The ABC cloud agent detects a third event associated with ABC cloud. An operation is initiated, in an ABC cloud computing resource. The ABC cloud agent determines that the operation requires manipulation of a secure on-premise database maintained by Jones Corp. The ABC cloud agent identifies a policy corresponding to the event. The ABC cloud agent retrieves the policy which maps to the event from the ABC cloud agent's configuration file. The corresponding policy is to initiate the operation on an on-premise processing resource of Jones Corp.

Based on the identified policy, the ABC cloud agent initiates the operation on the on-premise processing resource via SSH. The on-premise processing resource executes the operations, resulting in manipulation of the secure on-premise database.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 530 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable medium comprising instructions which, when executed by one or more hardware processors, causes performance of operations comprising:
    executing a first cloud computing agent associated with a first third-party cloud maintained by a first cloud vendor;
    accessing, by the first cloud computing agent, a cross-cloud repository comprising information associated with the first third-party cloud and a second third-party cloud maintained by a second cloud vendor different than the first cloud vendor;
    based on the accessing operation: discovering, by the first cloud computing agent, a resource in the second third-party cloud;
    detecting, by the first cloud computing agent, an event executed by or associated with a tenant's on-premise computing device; and
    responsive to detecting the event executed by or associated with the tenant's on-premise computing device:
        identifying a policy specifying at least one operation associated with the resource in the second third-party cloud;

based on the policy, initiating, by the first cloud computing agent, communication with the resource in the second third-party cloud; and executing the at least one operation associated with the resource in the second third-party cloud.

2. The medium of claim 1, wherein executing the operation associated with the resource in the second third-party cloud comprises synchronizing data across the first third-party cloud and the second third-party cloud.

3. The medium of claim 1, wherein initiating communication by the first cloud computing agent comprises subscribing to an event publisher executing in the second third-party cloud.

4. The medium of claim 1, wherein initiating communication by the first cloud computing agent comprises establishing a secure communication channel with a second cloud computing agent associated with the second third-party cloud.

5. The medium of claim 1, wherein initiating communication by the first cloud computing agent comprises invoking an application programming interface associated with the second third-party cloud.

6. The medium of claim 1, wherein the operations further comprise:

triggering, by the first cloud computing agent, an operation in the first third-party cloud in response to detecting a second event associated with the second third-party cloud.

7. The medium of claim 1, wherein the operations further comprise:

locking, by the first cloud computing agent, read access or write access to the resource in the second third-party cloud.

8. The medium of claim 1, wherein the operations further comprise:

specifying, by the first cloud computing agent, a physical region in which to store the resource in the second third-party cloud.

9. The medium of claim 1, wherein the operations further comprise:

specifying, by the first cloud computing agent, a service class associated with the resource in the second third-party cloud.

10. The medium of claim 1, wherein the policy is for reading from or writing to the resource in the second third-party cloud.

11. The medium of claim 1, wherein initiating communication by the first cloud computing agent comprises executing a push operation.

12. The medium of claim 1, wherein the resource in the second third-party cloud comprises a service account, in the second third-party cloud, for the first cloud computing agent.

13. The medium of claim 1, wherein:

initiating communication by the first cloud computing agent comprises:

transmitting a notification to a policy-handling cloud computing agent associated with the first third-party cloud;

identifying, by the policy-handling cloud computing agent, the policy;

based on the policy, initiating the communication with the resource in the second third-party cloud via an Application Programming Interface (API) of the second third-party cloud;

subscribing to an event publisher executing in the second third-party cloud;

establishing a secure communication channel with a second cloud computing agent executing the second third-party cloud;

invoking an application programming interface associated with the second third-party cloud;

executing a push operation;

executing an operation associated with the resource in the second third-party cloud;

executing the operation associated with the resource in the second third-party cloud is performed in response to detecting an event associated with the first third-party cloud;

executing the operation associated with the resource in the second third-party cloud comprises synchronizing data across the first third-party cloud and the second third-party cloud;

the resource in the second third-party cloud comprises a service account, in the second third-party cloud, for the first cloud computing agent;

the operations further comprise:

triggering, by the first cloud computing agent, an operation in the first third-party cloud in response to detecting an event associated with the second third-party cloud;

detecting, by the first cloud computing agent, an event executed by or associated with a tenant's on-premise computing device;

responsive to detecting the event executed by or associated with the tenant's on-premise computing device: initiating, by the first cloud computing agent, an operation in the second third-party cloud;

locking, by the first cloud computing agent, read access or write access to the resource in the second third-party cloud; and specifying, by the first cloud computing agent:

a physical region to store the resource in the second third-party cloud, a service class associated with the resource in the second third-party cloud, and a policy for reading from or writing to the resource in the second third-party cloud.

14. A method comprising:

executing a first cloud computing agent associated with a first third-party cloud maintained by a first cloud vendor;

accessing, by the first cloud computing agent, a cross-cloud repository comprising information associated with the first third-party cloud and a second third-party cloud maintained by a second cloud vendor different than the first cloud vendor;

based on the accessing operation: discovering, by the first cloud computing agent, a resource in the second third-party cloud;

detecting, by the first cloud computing agent, an event executed by or associated with a tenant's on-premise computing device; and responsive to detecting the event executed by or associated with the tenant's on-premise computing device:

identifying a policy specifying at least one operation associated with the resource in the second third-party cloud;

based on the policy, initiating, by the first cloud computing agent, communication with the resource in the second third-party cloud; and executing the at least one operation associated with the resource in the second third-party cloud;

wherein the method is performed by at least one device including a hardware processor.

15. A system comprising:

at least one device including a hardware processor;

the system configured to perform steps comprising:

executing a first cloud computing agent associated with a first third-party cloud maintained by a first cloud vendor;

accessing, by the first cloud computing agent, a cross-cloud repository comprising information associated with the first third-party cloud and a second third-party cloud maintained by a second cloud vendor different than the first cloud vendor;

based on the accessing operation: discovering, by the first cloud computing agent, a resource in the second third-party cloud;

detecting, by the first cloud computing agent, an event executed by or associated with a tenant's on-premise computing device; and responsive to detecting the event executed by or associated with the tenant's on-premise computing device:

identifying a policy specifying at least one operation associated with the resource in the second third-party cloud;

based on the policy, initiating, by the first cloud computing agent, communication with the resource in the second third-party cloud; and executing the at least one operation associated with the resource in the second third-party cloud.

16. The system of claim 15, wherein executing the operation associated with the resource in the second third-party cloud comprises synchronizing data across the first third-party cloud and the second third-party cloud.

17. The system of claim 15, wherein initiating communication by the first cloud computing agent comprises subscribing to an event publisher executing in the second third-party cloud.

18. The system of claim 15, wherein initiating communication by the first cloud computing agent comprises establishing a secure communication channel with a second cloud computing agent associated with the second third-party cloud.

19. The system of claim 15, wherein initiating communication by the first cloud computing agent comprises invoking an application programming interface associated with the second third-party cloud.

20. The system of claim 15, wherein the steps further comprise:

triggering, by the first cloud computing agent, an operation in the first third-party cloud in response to detecting a second event associated with the second third-party cloud.

\* \* \* \* \*

UNITED STATES PATENT AND TRADEMARK OFFICE
CERTIFICATE OF CORRECTION

PATENT NO. : 10,523,493 B2
APPLICATION NO. : 15/966505
DATED : December 31, 2019
INVENTOR(S) : Hill et al.

Page 1 of 1

It is certified that error appears in the above-identified patent and that said Letters Patent is hereby corrected as shown below:

In the Specification

In Column 7, Line 53, After "data" delete "e 111".

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*